(12) United States Patent
Kim et al.

(10) Patent No.: US 10,097,245 B2
(45) Date of Patent: Oct. 9, 2018

(54) MOBILE TERMINAL

(71) Applicant: LG Electronics Inc., Seoul (KR)

(72) Inventors: Junhee Kim, Seoul (KR); Myoungku Lee, Seoul (KR); Wonjin Choi, Seoul (KR); Peelhyuk Lim, Seoul (KR); Minho Park, Seoul (KR); Changbai Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/990,590

(22) Filed: Jan. 7, 2016

(65) Prior Publication Data

US 2016/0323428 A1   Nov. 3, 2016

(30) Foreign Application Priority Data

Apr. 30, 2015   (KR) .................. 10-2015-0061307

(51) Int. Cl.
| | |
|---|---|
| *H04B 5/00* | (2006.01) |
| *G06F 1/16* | (2006.01) |
| *H04M 1/02* | (2006.01) |
| *H04M 1/725* | (2006.01) |
| *G04G 21/00* | (2010.01) |

(52) U.S. Cl.
CPC ........... *H04B 5/0081* (2013.01); *G04G 21/00* (2013.01); *G06F 1/163* (2013.01); *G06F 1/1626* (2013.01); *G06F 1/1658* (2013.01); *G06F 1/1698* (2013.01); *H04M 1/026* (2013.01); *H04M 1/0266* (2013.01); *H04M 1/0277* (2013.01); *H04M 1/7253* (2013.01); *H04M 2250/04* (2013.01)

(58) Field of Classification Search
None
See application file for complete search history.

(56) References Cited

U.S. PATENT DOCUMENTS

| | | | | |
|---|---|---|---|---|
| 7,973,722 B1 * | 7/2011 | Hill | .......................... | H01Q 7/08 343/702 |
| 8,666,491 B2 * | 3/2014 | Chen | .................. | A61N 1/37229 607/32 |
| 9,356,661 B2 * | 5/2016 | Samardzija | ............. | G06F 1/163 |
| 2002/0105065 A1 * | 8/2002 | Parrault | ............. | G06K 7/10178 257/679 |
| 2004/0189625 A1 * | 9/2004 | Sato | ................. | G06K 19/07749 345/204 |
| 2005/0001031 A1 * | 1/2005 | Akiho | .................. | G06K 7/0008 235/451 |
| 2005/0052858 A1 * | 3/2005 | Shima | .................... | H04B 15/00 361/814 |

(Continued)

FOREIGN PATENT DOCUMENTS

| | | |
|---|---|---|
| EP | 2768165 A1 | 8/2014 |
| JP | 2005345704 A * | 12/2005 |

*Primary Examiner* — Gennadiy Tsvey
(74) *Attorney, Agent, or Firm* — Birch, Stewart, Kolasch & Birch, LLP

(57) ABSTRACT

A mobile terminal including a frame having a depressed portion; a display panel positioned on a first side of the frame facing the display panel; and a short range antenna disposed in the depressed portion and between the frame and the display panel and having a radiation direction toward the display panel.

19 Claims, 24 Drawing Sheets

(56) References Cited

U.S. PATENT DOCUMENTS

| | | | |
|---|---|---|---|
| 2006/0116168 A1* | 6/2006 | Kushima | G06K 7/10178 455/558 |
| 2008/0014787 A1* | 1/2008 | Kim | G06F 1/1626 439/517 |
| 2008/0186179 A1* | 8/2008 | Huang | G09F 27/00 340/572.1 |
| 2009/0002242 A1* | 1/2009 | Lasarov | H01Q 1/243 343/702 |
| 2009/0034843 A1* | 2/2009 | Wittkamper | G06F 3/002 382/181 |
| 2009/0167699 A1* | 7/2009 | Rosenblatt | G06F 3/044 345/173 |
| 2009/0254438 A1* | 10/2009 | Johnson, Jr. | G06Q 20/204 705/17 |
| 2009/0312054 A1* | 12/2009 | Choi | H04B 1/3816 455/558 |
| 2010/0025459 A1* | 2/2010 | Yamada | G06K 7/0013 235/375 |
| 2010/0302107 A1* | 12/2010 | Kilpi | H01Q 1/243 343/702 |
| 2010/0315389 A1* | 12/2010 | Sorrell | H01Q 1/22 345/204 |
| 2010/0320270 A1* | 12/2010 | Ryu | G06K 7/0008 235/435 |
| 2011/0024036 A1* | 2/2011 | Benato | G06K 19/07743 156/277 |
| 2011/0096388 A1* | 4/2011 | Agrawal | G02F 1/1506 359/268 |
| 2011/0193753 A1* | 8/2011 | Kim | H01Q 1/1271 343/702 |
| 2011/0210825 A1* | 9/2011 | Murakami | G06K 7/0008 340/10.1 |
| 2012/0019419 A1* | 1/2012 | Prat | H01Q 1/2266 343/702 |
| 2012/0038443 A1* | 2/2012 | Kubo | G06K 7/10336 336/90 |
| 2012/0206302 A1* | 8/2012 | Ramachandran | H01Q 1/24 343/702 |
| 2012/0282857 A1* | 11/2012 | Zhang | H04B 5/0031 455/41.1 |
| 2013/0078917 A1* | 3/2013 | Cho | H01Q 1/243 455/41.1 |
| 2013/0229362 A1* | 9/2013 | Liu | G06F 3/041 345/173 |
| 2014/0062827 A1* | 3/2014 | Kato | H01Q 1/38 343/856 |
| 2014/0112511 A1 | 4/2014 | Corbin et al. | |
| 2014/0177139 A1* | 6/2014 | Kari | H02J 50/12 361/679.01 |
| 2014/0213178 A1* | 7/2014 | Wolff | H01P 11/00 455/41.1 |
| 2015/0070233 A1* | 3/2015 | Nakamura | H01Q 7/06 343/788 |
| 2015/0207913 A1* | 7/2015 | Nakano | H01Q 7/00 455/41.1 |
| 2016/0056526 A1* | 2/2016 | Li | H01Q 9/42 343/702 |

\* cited by examiner

⟶ : first coil current
➙ : second coil current
--→ : ground coil current (a)

(b)

MOBILE TERMINAL

This application claims the benefit of Korean Patent Application No. 10-2015-0061307 filed on Apr. 30, 2015, the entire contents of which are incorporated herein by reference for all purposes as if fully set forth herein.

BACKGROUND OF THE INVENTION

Field of the Invention

The present disclosure relates to a mobile terminal. In particular, the present disclosure relates to a mobile terminal for performing short range communication, for example, near field communication (NFC) while having a terminal exterior formed of a metal material. The present disclosure also relates to a slim mobile terminal.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc. Efforts are ongoing to support and increase the functionality of the mobile terminals. Such efforts include software and hardware improvements, as well as changes and improvements in the structural components.

SUMMARY OF THE INVENTION

Accordingly, an object of the present invention is to address the above-noted and other problems.

Another aspect of the present disclosure is to provide a mobile terminal and a method for controlling the same capable of performing short range communication while having a terminal exterior formed of a metal material.

Another aspect of the present disclosure is to provide a slim mobile terminal and a method for controlling the same.

To achieve these and other advantages and in accordance with the purpose of the present invention, as embodied and broadly described herein, the present invention provides in one aspect a terminal including a frame having a depressed portion; a display panel positioned on a first side of the frame facing the display panel; and a short range antenna disposed in the depressed portion and between the frame and the display panel and having a radiation direction toward the display panel.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1A:
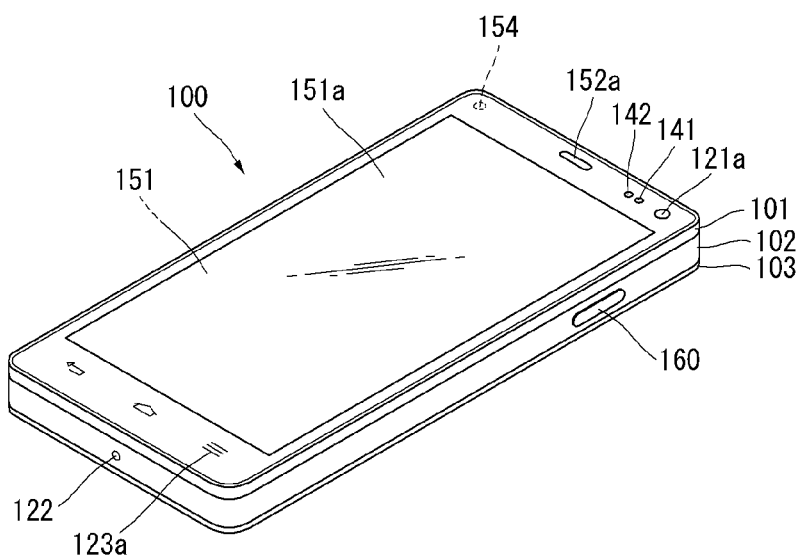
FIGS. 1A and 1B are conceptual views of an example of a mobile terminal according to an embodiment of the invention, viewed from different directions.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed. When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context. In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity. Electronic devices disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of electronic devices, such as those types noted above. In addition, these teachings may also be applied to stationary terminals such as digital TV, desktop computers, and the like.

Figure 1B:
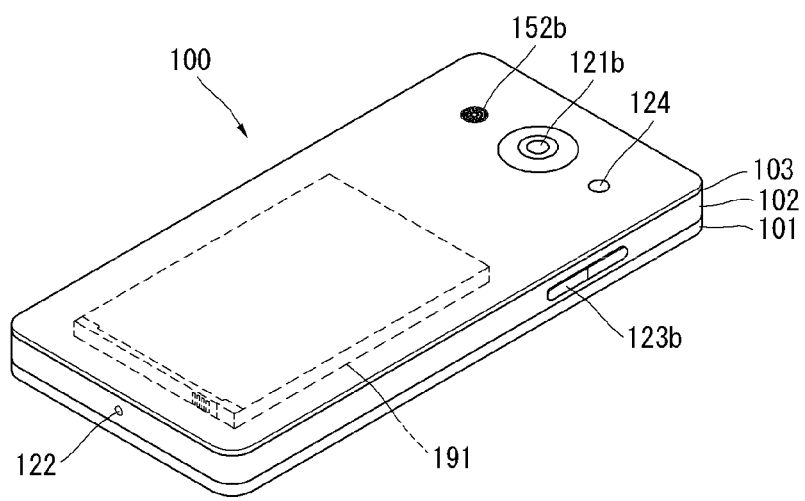

Reference is now made to FIGS. 1A and 1B, where FIGS. 1A and 1B are conceptual views of an example of a mobile terminal according to an embodiment of the invention, viewed from different directions. Referring now to FIGS. 1A and 1B, a mobile terminal 100 according to the embodiment of the invention is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In the embodiment disclosed herein, a body (hereinafter, referred to as "terminal body") of the mobile terminal 100 may be understood as regarding the mobile terminal 100 as at least one assembly. The mobile terminal 100 will generally include a case (for example, frame, housing, cover, and the like) forming an appearance of the terminal. In this embodiment, the case is formed using a front case 101 and a back case 102. Various electronic components are incorporated into a space formed between the front case 101 and the back case 102. At least one middle case may be additionally positioned between the front case 101 and the back case 102.

A display unit 151 is located on the front side of the terminal body to output information. As illustrated, a window 151a of the display unit 151 may be mounted to the front case 101 to form a front surface of the terminal body together with the front case 101. In some embodiments, electronic components may also be mounted to the back case 102. Examples of such electronic components include a detachable battery, an identification module, a memory card, and the like. A back cover 103 is shown covering the electronic components, and this cover may be detachably coupled to the back case 102. Therefore, when the back cover 103 is detached from the back case 102, the electronic components mounted to the back case 102 are externally exposed.

As illustrated, when the back cover 103 is coupled to the back case 102, a side surface of the back case 102 is partially exposed. In some cases, upon the coupling, the back case 102 may also be completely shielded by the back cover 103. In some embodiments, the back cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a back surface.

If desired, the mobile terminal 100 may include a waterproofing unit for preventing introduction of water into the terminal body. For example, the waterproofing unit may include a waterproofing member which is located between the window 151a and the front case 101, between the front case 101 and the back case 102, or between the back case 102 and the back cover 103, to hermetically seal an inner space when those cases are coupled.

The mobile terminal 100 may include the display unit 151, first and second audio output modules 152a and 152b, a proximity sensor 141, an illumination sensor 142, an optical output module 154, first and second cameras 121a and 121b, first and second manipulation units 123a and 123b, a microphone 122, and an interface unit 160.

FIGS. 1A and 1B show that the display unit 151, the first audio output module 152a, the proximity sensor 141, the illumination sensor 142, the optical output module 154, the first camera 121a, and the first manipulation unit 123a are disposed on the front surface of the terminal body; the second manipulation unit 123b, the microphone 122, and the interface unit 160 are disposed on the side surface of the terminal body; and the second audio output module 152b and the second camera 121b are disposed on the back surface of the terminal body, as an example.

FIGS. 1A and 1B depict certain components as arranged on the mobile terminal. However, alternative arrangements are possible and within the teachings of the present invention. Some components may be omitted or rearranged. For example, the first manipulation unit 123a may be located on another surface of the terminal body, and the second audio output module 152b may be located on the side surface of the terminal body.

The display unit 151 outputs (displays) information processed in the mobile terminal 100. For example, the display unit 151 may display execution screen information of an application program executing at the mobile terminal 100 or user interface (UI) and graphic user interface (GUI) information in response to the execution screen information. The display unit 151 may be implemented using one or more suitable display devices. Examples of such suitable display devices include a liquid crystal display (LCD), a thin film transistor-liquid crystal display (TFT-LCD), an organic light emitting diode (OLED) display, a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and a controller 180 (refer to FIG. 22), for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a back surface of the window 151a, or a metal wire which is patterned directly on the back surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as a user input unit 123 (refer to FIG. 22). Therefore, the touch screen may replace at least some of the functions of the first manipulation unit 123a. The first audio output module 152a may be implemented as a receiver for transferring a call sound to a user's ear. The second audio output module 152b may be implemented as a speaker outputting voice audio, alarm sounds, multimedia audio reproduction, and the like.

The window 151a of the display unit 151 may typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller 180 can control the optical output unit 154 so that the output of light stops.

The first camera 121a can process image frames such as still or moving images obtained by the image sensor in a capture mode or a video call mode. The processed image frames can then be displayed on the display unit 151 or stored in a memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1A illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a back input unit may be located on the back surface of the terminal body. The back input unit can be manipulated by a user to provide input to the mobile terminal 100. The input may be used in a variety of different ways. For example, the back input unit may be used by the user to provide an input for power on/off, start, end, scroll, control volume level being output from the first or second audio output modules 152a or 152b, switch to a touch recognition mode of the display unit 151, and the like. The back input unit may be configured to permit touch input, a push input, or combinations thereof.

The back input unit may be located to overlap the display unit 151 of the front side in a thickness direction of the terminal body. As an example, the back input unit may be located on an upper end portion of the back side of the terminal body such that the user can easily manipulate it using a forefinger when the user grabs the terminal body with one hand. Alternatively, the back input unit can be positioned at most any location of the back side of the terminal body.

Embodiments that include the back input unit may implement some or all of the functionality of the first manipulation unit 123a in the back input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the back side of the terminal body and includes an image capturing direction that is substantially opposite to the image capturing direction of the first camera unit 121a. If desired, the second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1B, a flash 124 is shown adjacent to the second camera 121b. When an image of a subject is captured with the camera 121b, the flash 124 may illuminate the subject. As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of a broadcast receiving module 111 (refer to FIG. 22) may be retractable into the terminal body. Alternatively, an antenna may be formed using a film attached to an inner surface of the back cover 103, or a case that includes a conductive material.

A power supply unit 190 (refer to FIG. 22) for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. The wireless charging may be implemented by magnetic induction or electromagnetic resonance.

The back cover 103 is shown coupled to the back case 102 for shielding the battery 191, to prevent separation of the battery 191, and to protect the battery 191 from an external impact or from foreign material. When the battery 191 is detachable from the terminal body, the back case 103 may be detachably coupled to the back case 102.

An accessory for protecting an appearance or assisting or extending the functions of the mobile terminal 100 can also be provided for the mobile terminal 100. As an example of the accessory, a cover or a pouch for covering or accommodating at least one surface of the mobile terminal 100 may be provided. The cover or the pouch may cooperate with the display unit 151 to extend the function of the mobile terminal 100. Another example of the accessory is a touch pen for assisting or extending a touch input to a touch screen.

Figure 2:
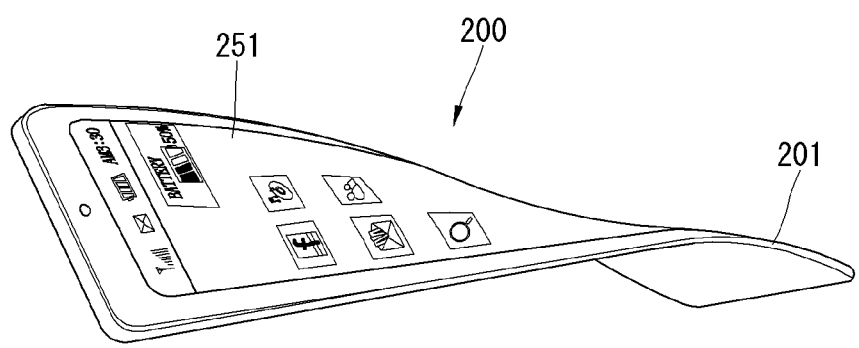
FIG. 2 is a conceptual view of another example of a transformable mobile terminal according to an embodiment of the invention.

In the embodiment of the invention, information processed in the mobile terminal 100 may be displayed using the flexible display. This is described in detail below. In particular, FIG. 2 is a conceptual view of another example of a transformable mobile terminal according to the embodiment of the invention. As shown in FIG. 2, a mobile terminal 200 is shown having a display unit 251, which can be transformably configured by an external force. This transformation, which includes the display unit 251 and other components of the mobile terminal 200, may include any of curving, bending, folding, twisting, rolling, and combinations thereof. The transformable display unit 251 may also be referred to as a "flexible display unit." In some implementations, the flexible display unit 251 may include a general flexible display, electronic paper (also known as e-paper), and combinations thereof. In general, the mobile terminal 200 may be configured to include features that are the same as or similar to that of the mobile terminal 100 of FIGS. 1a and 1b.

The flexible display of the mobile terminal 200 is generally formed as a lightweight, non-fragile display, which still exhibits characteristics of an existing flat panel display, but is instead fabricated on a flexible substrate which can be transformed as noted previously. The term e-paper may be used to refer to a display technology employing the characteristic of a general ink, and is different from the existing flat panel display in view of using reflected light. E-paper is generally understood as changing displayed information using a twist ball or via electrophoresis using a capsule.

When the flexible display unit 251 is not transformed (for example, in a state with an infinite radius of curvature and referred to as a first state), a display region of the flexible display unit 251 includes a generally flat surface. When the flexible display unit 251 is transformed from the first state by an external force (for example, a state with a finite radius of curvature and referred to as a second state), the display region may become a curved surface or a bent surface. As shown in FIG. 2, information displayed in the second state may be visual information output on the curved surface. The visual information may be realized so a light emission of each unit pixel (subpixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is transformed into the flat state (or a less curved state) or into a more curved state.

If desired, the flexible display unit 251 may implement a flexible touch screen using a touch sensor in combination with the display. When a touch is received at the flexible touch screen, the controller 180 (refer to FIG. 22) can execute certain control corresponding to the touch input. In general, the flexible touch screen is configured to sense touch and other input while in both the first and second states. One option is to configure the mobile terminal 200 to include a transformation sensor which senses the transforming of the flexible display unit 251. The transformation sensor may be included in a sensing unit 140 (refer to FIG. 22).

The transformation sensor may be located in the flexible display unit 251 or a case 201 to sense information related to the transforming of the flexible display unit 251. Examples of such information related to the transforming of the flexible display unit 251 may be a transformed direction, a transformed degree, a transformed position, a transformed amount of time, an acceleration that the transformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, the controller 180 or other component can change information displayed on the flexible display unit 251, or generate a control signal for controlling a function of the mobile terminal 200, based on the information related to the transforming of the flexible display unit 251. Such information is typically sensed by the transformation sensor.

The mobile terminal 200 is shown having the case 201 for accommodating the flexible display unit 251. The case 201 can be transformable together with the flexible display unit 251, taking into account the characteristics of the flexible display unit 251. A battery located in the mobile terminal 200 may also be transformable in cooperation with the flexible display unit 251, taking into account the characteristic of the flexible display unit 251. One technique to implement such a battery is to use a stack and folding method of stacking battery cells.

The transformation of the flexible display unit 251 is not limited to transforming from an external force. For example, the flexible display unit 251 can be transformed into the second state from the first state by a user command, application command, or the like.

Figure 3:
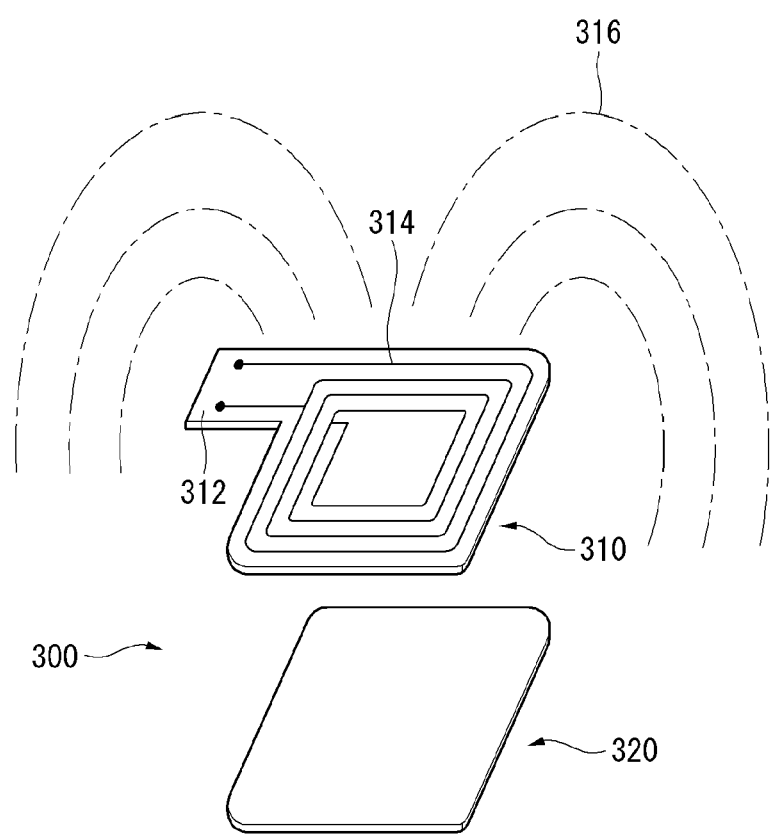
FIG. 3 shows an example of a configuration and an operation of an antenna for short range communication according to an embodiment of the invention.

FIG. 3 shows an example of a configuration and an operation of an antenna for short range communication according to the embodiment of the invention. More specifically, FIG. 3 shows an antenna 310 for short range communication and a shielding layer 320. The antenna 310 for short range communication includes a board 312 and wires 314 positioned on the board 312.

The antenna 310 for short range communication may be a near field communication (NFC) antenna, for example. The board 312 may be formed of a flexible material or a hard material. When the board 312 is formed of the flexible material, the board 312 may be formed in the form of a film. The wires 314 may be disposed on the board 312. For example, the antenna 310 for short range communication may be a flexible printed circuit board (FPCB). In this instance, the wires 314 may form the winding on the board 312. A number of winding turns may be one or more than one.

In addition, the shielding layer 320 may be formed of an electromagnetic wave shielding material, so that an external influence on an electromagnetic field 316 formed in the antenna 310 for short range communication can be minimized. For example, the shielding layer 320 may be formed of ferrite sheet.

When the electromagnetic field 316 is formed in the antenna 310 for short range communication, electric current flows in the wires 314. On the contrary, when electric current flows in the wires 314, the electromagnetic field 316 is formed in the antenna 310 for short range communication. The mobile terminal can thus transmit and receive signals to and from an external terminal using this. In this instance, the shielding layer 320 is positioned opposite the external terminal with the antenna 310 for short range communication interposed therebetween, thereby reducing a noise and improving a quality factor (or a selection factor), etc. Hereinafter, an antenna 300 is regarded as including the antenna 310 for short range communication and the shielding layer 320.

Figure 4:
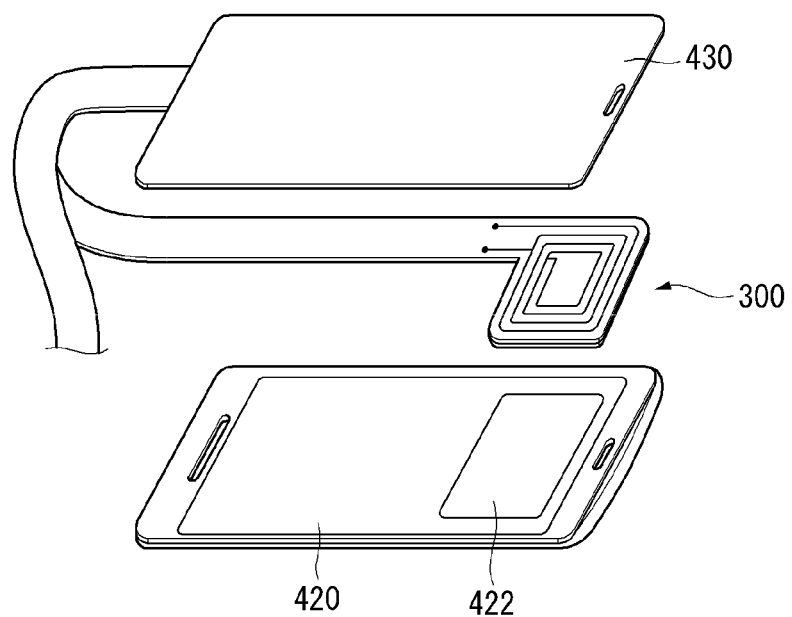
FIGS. 4 to 8 show examples of a mobile terminal according to an embodiment of the invention.

Next, FIG. 4 shows an example of the mobile terminal according to the embodiment of the invention. More specifically, FIG. 4 shows a frame 420, a display panel 430, and an antenna 300 of the mobile terminal. The frame 420 may be a frame of the mobile terminal and also may be a frame of the display panel 430. The frame 420 is also used to fix the electronic components at a proper location. However, the frame 420 is not limited to that noted previously.

In addition, the frame 420 may be formed of synthetic resin or metal and include a depression 422. The depression 422 is formed on one side of the frame 420. More specifically, the depression 422 may be formed toward an upper portion of the display panel 430 (i.e., an upper portion of the frame 420) based on a portrait view. Hence, a user can easily perform tagging when the user grabs the mobile terminal in a general manner.

In addition, the display panel 430 may be an LCD panel or an OLED display panel. Other display panels may also be used. Further, the antenna 300 is positioned between the frame 420 and the display panel 430. Further, the antenna 300 is also placed on the depression 422 of the frame 420. Hence, the rigidity required in the mobile terminal can be maintained, and the slim mobile terminal can be implemented.

Figure 5:
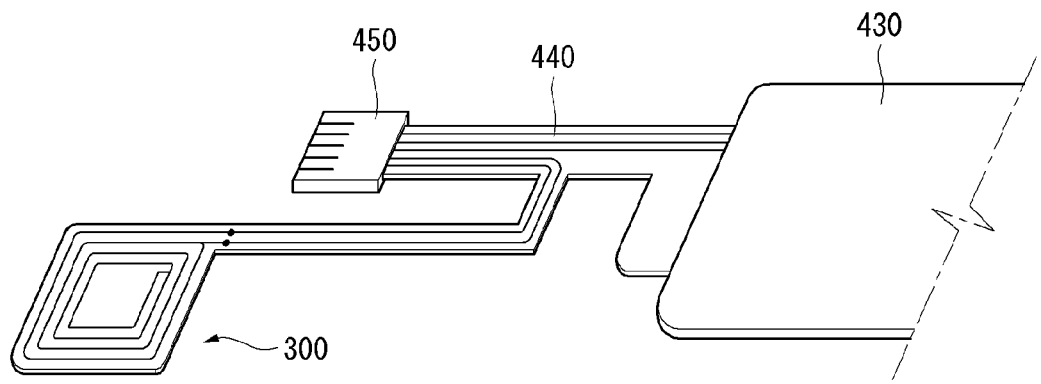

Next, FIG. 5 shows an example of the mobile terminal according to another embodiment of the invention. More specifically, FIG. 5 shows a display panel 430, an antenna 300, and a FPCB 440 of the mobile terminal. The FPCB 440 is electrically connected to the display panel 430 and can transmit and receive image information to and from the display panel 430. Further, any component capable of performing the above-described function may be used, and the embodiment of the invention is not limited to the FPCB.

As shown, the antenna 300 may be positioned on the FPCB 440. This means that the antenna 300 shares the same surface with the FPCB 440. For example, the antenna 300 may be integrally formed with the FPCB 440. In this instance, the antenna 300 can share a connector 450 with the FPCB 440. Further, the antenna 300 can be electrically insulated from the FPCB 440. Hence, an assembling process is simplified.

Figure 6:
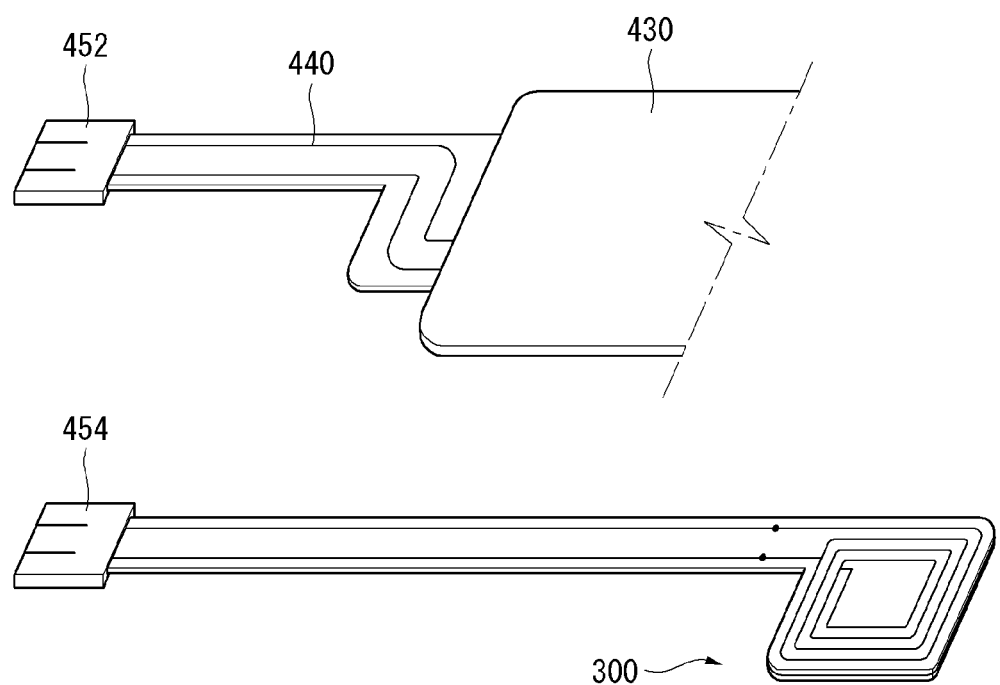

FIG. 6 shows an example of the mobile terminal according to still another embodiment of the invention. More specifically, FIG. 6 shows a display panel 430, an antenna 300, and a FPCB 440 of the mobile terminal. The antenna 300 is positioned to be separated from the FPCB 440. In this instance, the FPCB 440 and the antenna 300 respectively include connectors 452 and 454. There are various methods for electrically connecting the connectors 452 and 454 to the controller. Hence, when one of the FPCB 440 and the antenna 300 needs to be repaired, the repair cost can be reduced.

Figure 7:
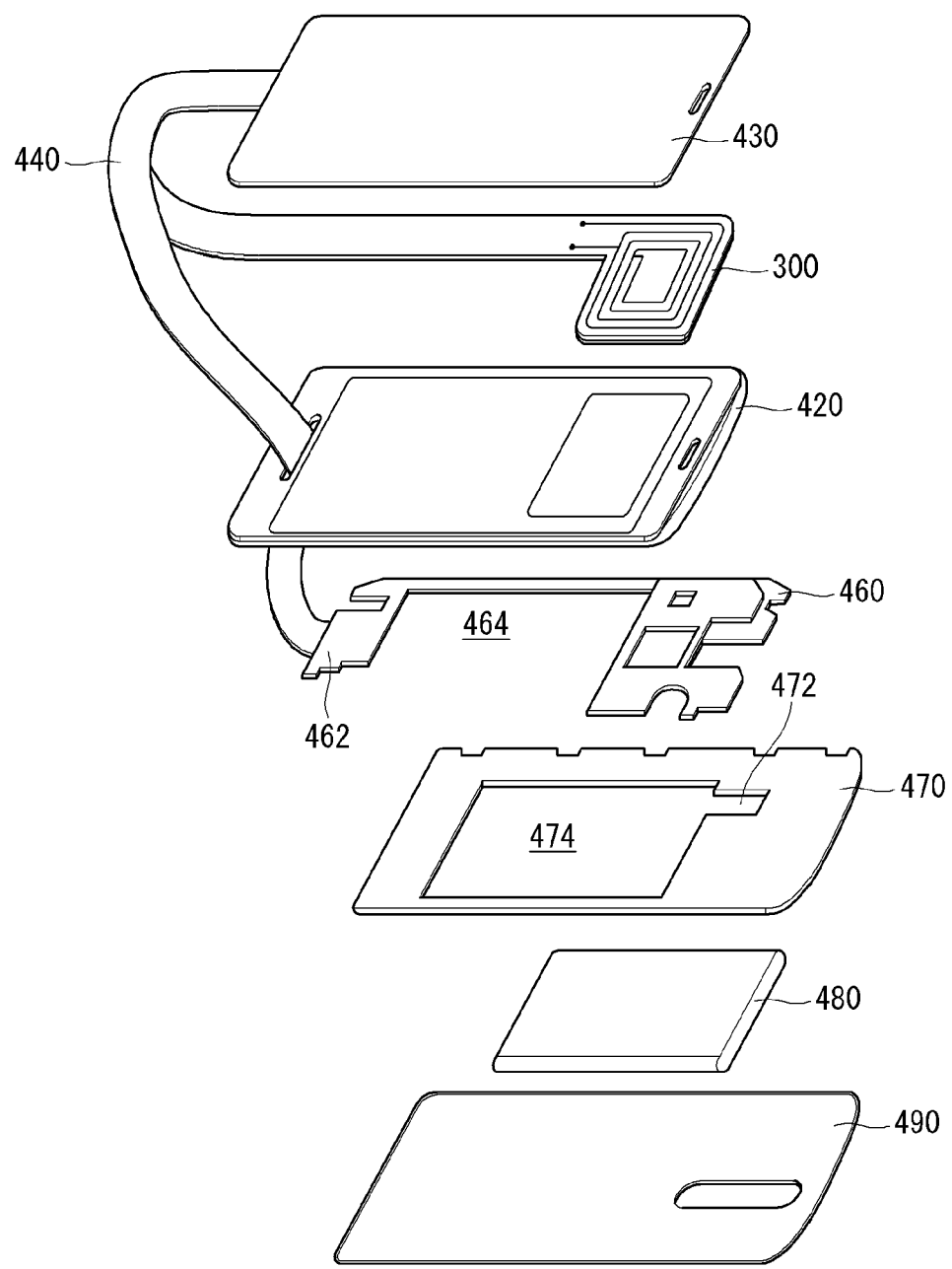

FIG. 7 shows an example of the mobile terminal according to an embodiment of the invention. More specifically, FIG. 7 shows a display panel 430, an antenna 300, a FPCB 440, a frame 420, a PCB 460, a back cover 470, a battery 480, and a battery cover 490 of the mobile terminal. Structures and components identical or equivalent to those described above are designated with the same reference numerals, and a further description may be briefly made or may be entirely omitted.

The PCB 460 includes at least one electronic element. A sensor, an input unit, the controller, etc. for operating the mobile terminal can be mounted on the electronic element. Further, the plurality of electronic elements may also be mounted, or may be integrated into one element and mounted. The electronic element can be a connector 462 for electrically connecting the FPCB 440 to the controller. The PCB 460 has an area 464, to which the battery 480 is exposed, so that the slim mobile terminal is implemented. The battery 480 can also have a maximum thickness among the components of the mobile terminal.

Further, the FPCB 440 is electrically connected to the electronic element. More specifically, the FPCB 440 passes through the surface of the frame 420 and is electrically connected to the electronic element. In addition, the back cover 470 fixes the PCB 460 to the frame 420. The back cover 470 may correspond to the PCB 460 as well as the frame 420. Further, the back cover 470 may be fixed to the frame 420 through screw-coupling. The back cover 470 can also have an area 472, to which a portion of the PCB 460 is exposed. The back cover 470 can also have an area 474, to which the battery 480 is exposed, so that the slim mobile terminal is implemented. Thus, the mobile terminal can consequentially have battery receiving portions 464 and 474 corresponding to the battery exposure areas 464 and 474 respectively included in the PCB 460 and the back cover 470. Further, the battery 480 is used to supply electric power to the mobile terminal and may be a secondary cell. The battery 480 may also be placed in the battery receiving portions 464 and 474.

Further, the battery cover 490 simultaneously covers a back surface of the back cover 470 and the battery 480 and can be fixed to the mobile terminal. Namely, the battery cover 490 forms the exterior of the mobile terminal. The battery cover 490 may be formed of metal or synthetic resin. When the battery cover 490 is formed of metal, the durability of the mobile terminal can be improved, and also the mobile terminal can have an attractive appearance.

Figure 8:
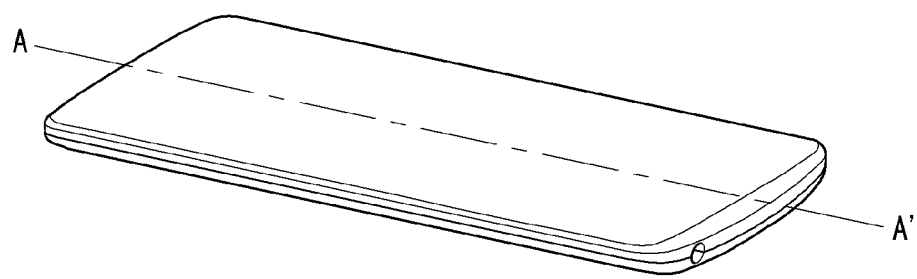
Figure 9:
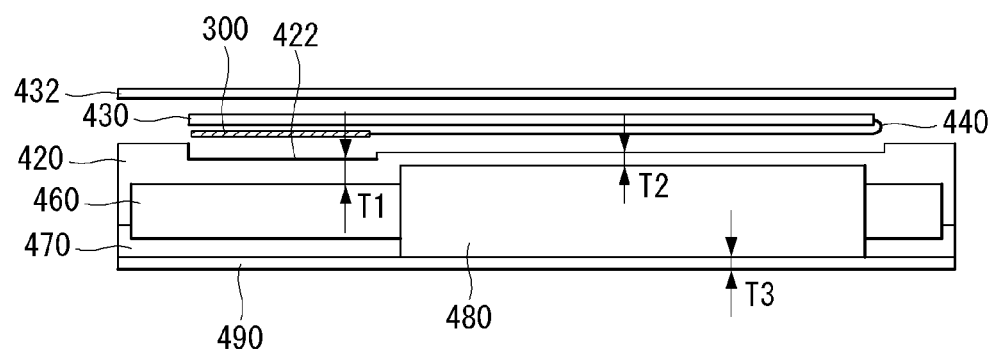
FIGS. 9 to 11 show examples of a cross section of a mobile terminal shown in FIG. 8.

Next, FIG. 8 shows an example of the mobile terminal according to the embodiment of the invention. More specifically, FIG. 8 shows line A-A' for illustrating a cross section of the mobile terminal, and FIG. 9 shows an example of a cross section of the mobile terminal shown in FIG. 8. More specifically, FIG. 9 shows a touch window 432, a display panel 430, an antenna 300, a FPCB 440, a frame 420, a depression 422, a PCB 460, a back cover 470, a battery 480, and a battery cover 490 of the mobile terminal. In FIG. 9, the frame 420, the back cover 470, and the battery cover 490 may be formed of synthetic resin.

Further, the frame 420 may be configured so that the durability of the mobile terminal can be secured at a predetermined level when an external force is applied to the mobile terminal. For this, the frame 420 may have predetermined thicknesses T1 and T2. Namely, when the thickness of the frame 420 is equal to or less than the predetermined thicknesses T1 and T2, the mobile terminal may be easily damaged. In other words, when the thickness of the frame 420 is equal to or less than the predetermined thicknesses T1 and T2, the durability of the mobile terminal may be deteriorated. When the depression 422 is positioned in an area except a portion of the frame 420 having the thickness T2, the durability of the mobile terminal can be secured at the predetermined level. As a result, the frame 420 may have the desired thicknesses T1 and T2 and may be formed of metal for an improvement in the durability of the mobile terminal.

In addition, the battery cover 490 mainly forms the appearance of the mobile terminal and may have a predetermined thickness T3. The battery cover 490 can reduce the thickness at a desired level, unlike a related art battery cover which has a limit to a reduction in a thickness because of an antenna for the short range communication. As a result, the battery cover 490 may have the desired thickness T3 and may be formed of metal for the improvement in the durability of the mobile terminal.

A formation location of the depression 422 in the frame 420 may be different from a mounting location of the battery 480 in the frame 420. Namely, the depression 422 may be positioned in an area except the portion of the frame 420 having the thickness T2. Hence, the frame 420 can have the predetermined thicknesses T1 and T2 required to secure the durability of the mobile terminal. The description, in which the antenna 300 is placed on the depression 422, was given above. The mobile terminal can be slimmer through the above-described configuration.

Figure 10:
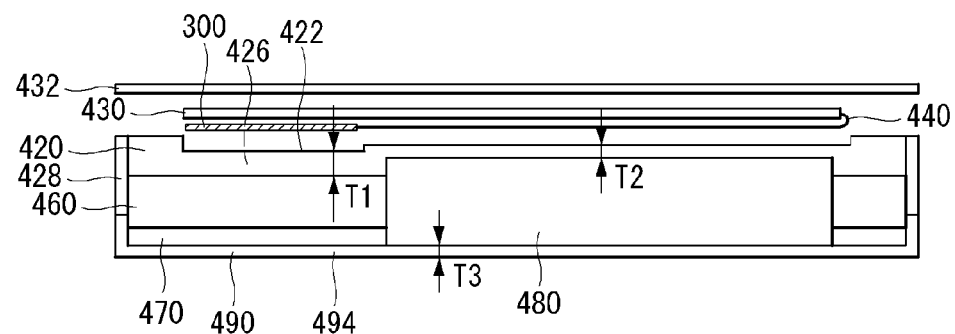

Next, FIG. 10 shows a touch window 432, a display panel 430, an antenna 300, a FPCB 440, a frame 420, a depression 422, a PCB 460, a back cover 470, a battery 480, and a battery cover 490 of the mobile terminal. In FIG. 10, an inner part 426 of the frame 420 is formed of synthetic resin, and an outer part 428 of the frame 420 is formed of metal. The battery cover 490 is formed of metal.

A formation location of the depression 422 in the frame 420 may be different from a mounting location of the battery 480 in the frame 420. Namely, the depression 422 may be positioned in an area except a portion of the frame 420 having a thickness T2. Hence, the frame 420 may have predetermined thicknesses T1 and T2 required to secure the durability of the mobile terminal. The description, in which the antenna 300 is placed on the depression 422, was given above. The mobile terminal can be slimmer through the above-described configuration.

When the outer part 428 of the frame 420 and the battery cover 490 are formed of metal, the antenna 300 radiates in the opposite direction to the metal and may exhibit a performance. An influence of metal on the antenna 300 has been already mentioned with reference to FIG. 3 when the shielding layer 320 is described. When the antenna 300 is positioned between the display panel 430 and the frame 420, the mobile terminal may gather and transfer information through the short range communication without being disturbed. Further, when the antenna 300 is positioned between the display panel 430 and the frame 420, the antenna 300 may operate without an interference of an electromagnetic wave resulting from the electronic components included in the mobile terminal or metal.

Figure 11:
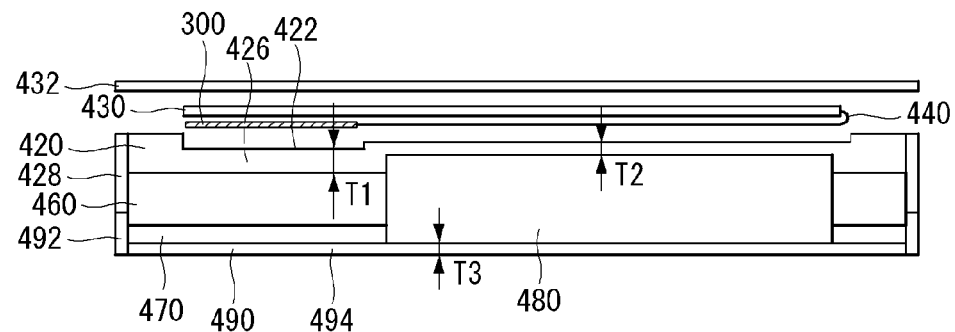

FIG. 11 shows a touch window 432, a display panel 430, an antenna 300, a FPCB 440, a frame 420, a depression 422, a PCB 460, a back cover 470, a battery 480, and a battery cover 490 of the mobile terminal. In FIG. 11, an inner part 426 of the frame 420 is formed of synthetic resin, and an outer part 428 of the frame 420 is formed of metal. A portion 492 of the battery cover 490 is formed of metal, and another portion 494 of the battery cover 490 may be formed of synthetic resin.

A formation location of the depression 422 in the frame 420 may be different from a mounting location of the battery 480 in the frame 420. Namely, the depression 422 can be positioned in an area except a portion of the frame 420 having a thickness T2. Hence, the frame 420 can have predetermined thicknesses T1 and T2 required to secure the durability of the mobile terminal. The description, in which the antenna 300 is placed on the depression 422, was given above. The mobile terminal can be slimmer through the above-described configuration. Referring to FIGS. 9 to 11, the frame 420, the back cover 470, and the battery cover 490 may be formed integrally formed.

Figure 12:
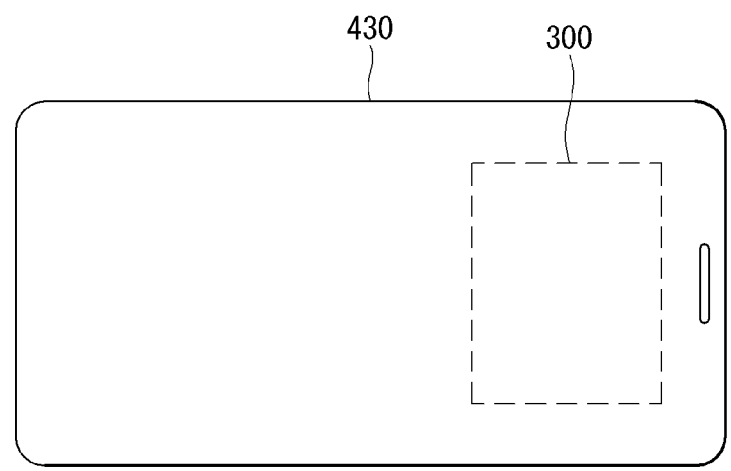
FIGS. 12 to 14 show examples of a front surface of a mobile terminal according to an embodiment of the invention.

Next, FIG. 12 shows an example of a front surface of the mobile terminal according to one embodiment of the invention. More specifically, FIG. 12 shows a display panel 430 and an antenna 300 of the mobile terminal. The antenna 300 may be formed on an upper portion of the display panel 430 when the display panel 430 is a portrait view. When the user makes an attempt at the short range communication, the user grabbing the mobile terminal in a general manner can easily perform tagging due to such a location of the antenna 300.

Figure 13:
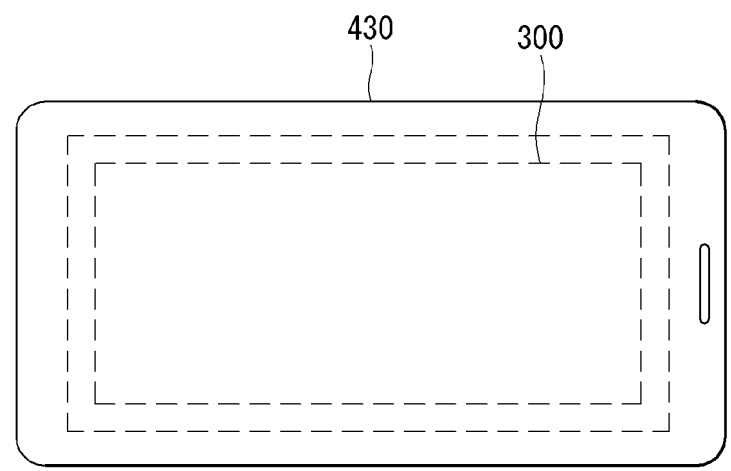
Figure 14:
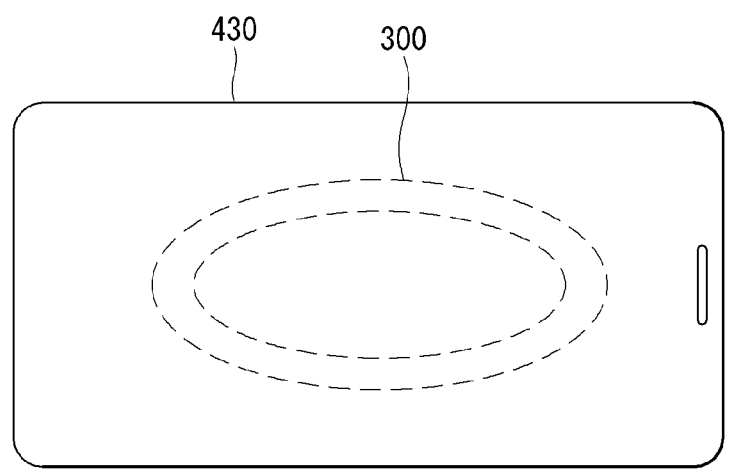

FIGS. 13 and 14 show another example of a front surface of the mobile terminal according to one embodiment of the invention. More specifically, FIGS. 13 and 14 show a display panel 430 and an antenna 300 of the mobile terminal. The antenna 300 may be positioned around the display panel 430. When the user makes an attempt at the short range communication, the user can increase a success rate of tagging due to such a location of the antenna 300. In addition, such a location of the antenna 300 can improve a radiation performance of the antenna 300.

Figure 15:
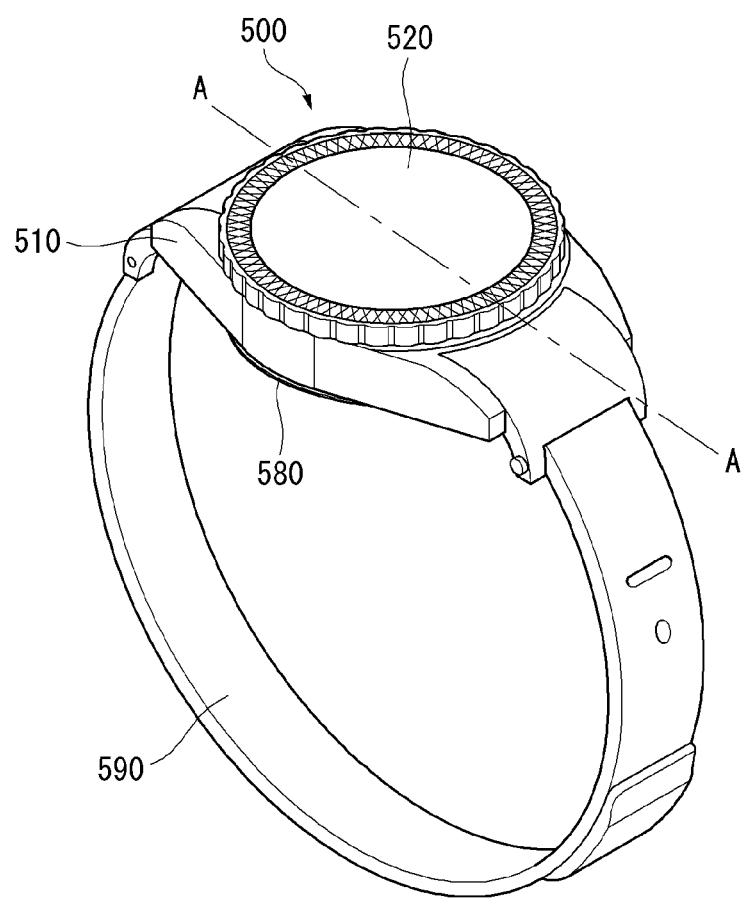
FIGS. 15 and 16 show an example of a wearable device according to an embodiment of the invention.
Figure 16:
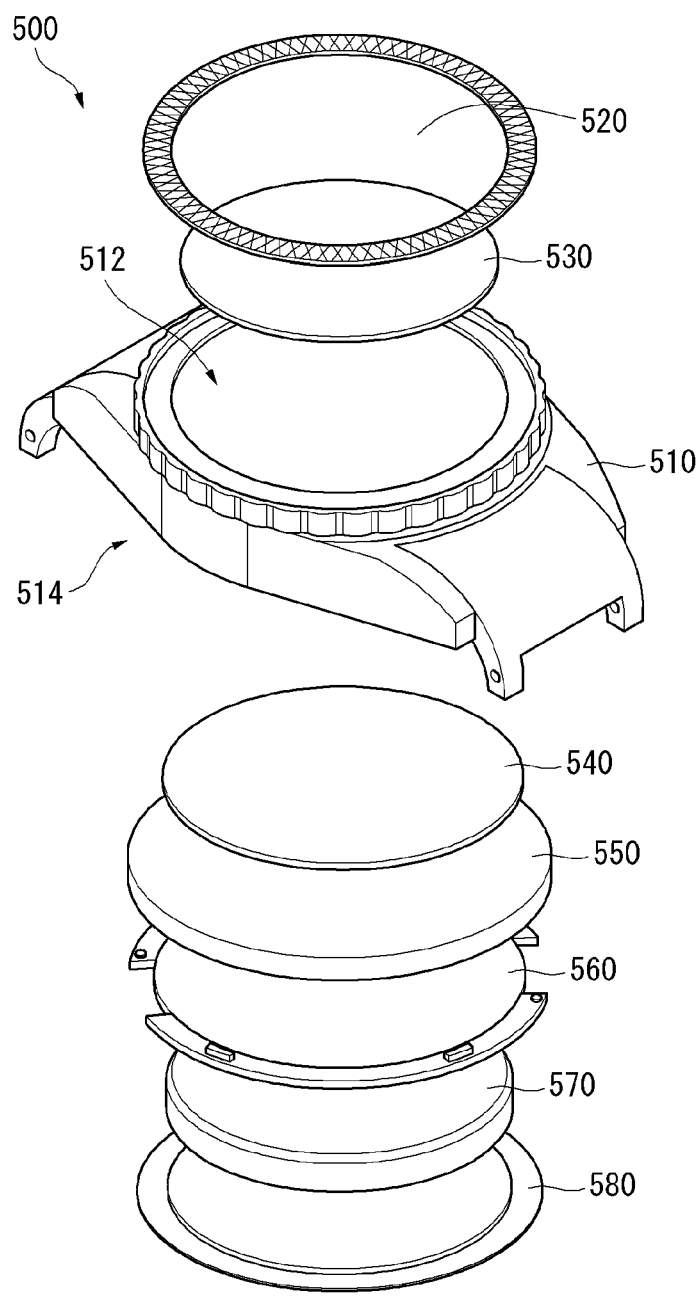
Figure 17:
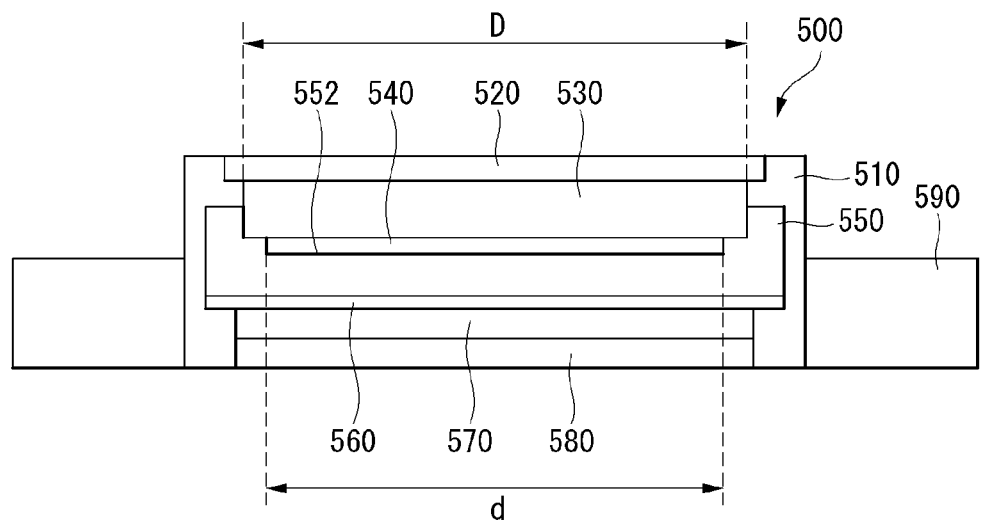
FIG. 17 shows an example of a cross section of a wearable device according to an embodiment of the invention.

FIGS. 15 and 16 show an example of a wearable device according to the embodiment of the invention, and FIG. 17 shows an example of a cross section of the wearable device according to the embodiment of the invention. A wearable device 500 according to the embodiment of the invention is a kind of the mobile terminal. In other words, the wearable device 500 is the mobile terminal the user wears on his or her body. The wearable device 500 may include all or some of the components of the mobile terminal which were described above and will be described later. Structures and components identical or equivalent to those described above are designated with the same reference numerals, and a further description may be briefly made or may be entirely omitted.

More specifically, FIGS. 15 and 16 show a body 510, a touch window 520, a display panel 530, an antenna 540, a frame 550, a PCB 560, a battery 570, a back cover 580, and a band 590 of the wearable device 500. The display panel 530 is positioned on one side of the frame 550. The antenna 540 is positioned between the frame 550 and the display panel 530. The PCB 560 may be positioned on the other side of the frame 550. The body 510 may contain the display panel 530, the antenna 540, the frame 550, the PCB 560, and the battery 570.

Further, the touch window 520 may cover a front opening 512 of the body 510, and the back cover 580 may cover a back opening 514 of the body 510. The body 510 and the back cover 580 may be formed of synthetic resin or metal. The wearable device 500 may also include a sealing member for dust proofing or damp proofing characteristics of the wearable device 500. In more detail, the sealing member may be interposed between the body 510 and the touch window 520 and between the body 510 and the back cover 580.

FIG. 17 is a cross-sectional view taken along line A-A' of FIG. 15. The frame 550 may be a frame of the wearable device 500 and be used to fix the electronic components at a proper location. The frame 550 is not limited to that noted previously. The frame 550 may also be formed of synthetic resin or metal. Further, the frame 550 may include a depression 552. The depression 552 may be formed on one side of the frame 550. When an external diameter d of the antenna 540 is close to an internal diameter D of the frame 550, the depression 552 may be omitted. Hence, the user can easily perform tagging in a stage where the user generally wears the mobile terminal.

The back cover 580 may cover a back surface 514 of the wearable device 500 and may be fixed to the wearable device 500. Namely, the back cover 580 may form the exterior of the wearable device 500. When the back cover 580 is formed of metal, the back cover 580 can improve durability of the wearable device 500 and also can provide an attractive appearance of the wearable device 500. Further, when the back cover 580 is formed of metal, the back cover 580 can withstand a predetermined pressure generated when the back cover 580 is coupled with the body 510.

When the body 510 or the back cover 580 is formed of metal, the antenna 540 radiates in the opposite direction to the metal and may exhibit a performance. An influence of metal on the antenna 540 has been already mentioned with reference to FIG. 3 when the shielding layer 320 is described. When the antenna 540 is positioned between the display panel 530 and the frame 550, the wearable device 500 may gather and transfer information through the short range communication without being disturbed. Further, when the antenna 540 is positioned between the display panel 530 and the frame 550, the antenna 540 may operate without an interference of an electromagnetic wave resulting from the electronic components included in the wearable device 500 or metal.

Figure 18:
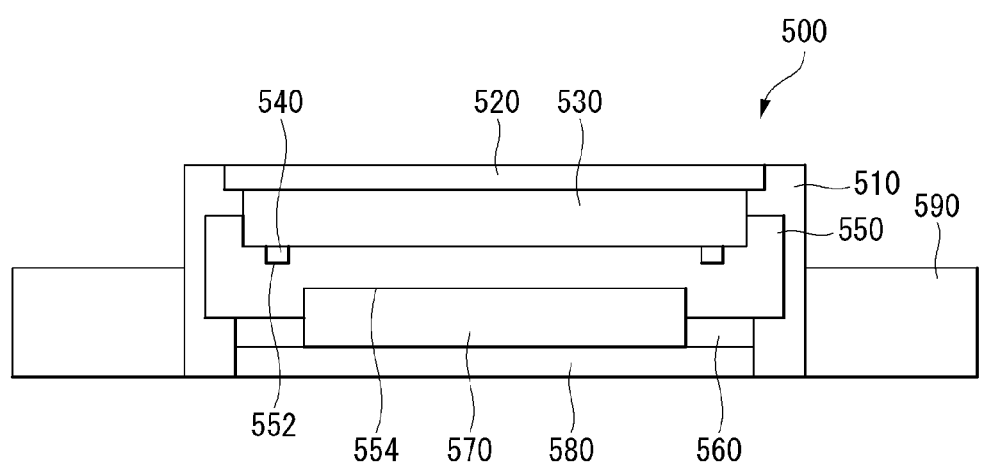
FIG. 18 shows another example of a wearable device according to an embodiment of the invention.
Figure 19:
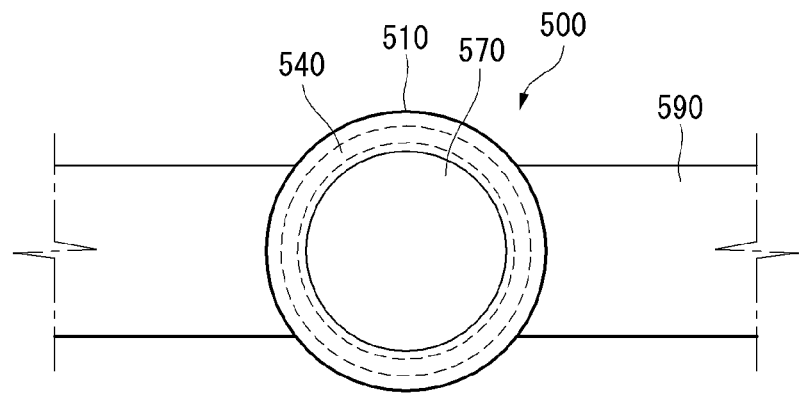
FIG. 19 shows an example of a front surface of a wearable device shown in FIG. 18.

FIG. 18 shows another example of the wearable device according to the embodiment of the invention, and FIG. 19 shows an example of a front surface of the wearable device shown in FIG. 18. Structures and components identical or equivalent to those described above are designated with the same reference numerals, and a further description may be briefly made or may be entirely omitted.

A formation location of the depression 552 in the frame 550 may be different from a mounting location of the battery 570 in the frame 550. The depression 552 may be formed in an outer portion of the frame 550. The antenna 540 may be placed on the depression 552, and the battery 570 may be positioned in the middle of the frame 550. The slim wearable device 500 may be implemented because the depression 552 is formed in the frame 550. A depression 554 for mounting the battery 570 may be formed in the middle of the frame 550. The slim wearable device 500 may be implemented because the depression 554 for mounting the battery 570 is formed in the middle of the frame 550.

Figure 20:
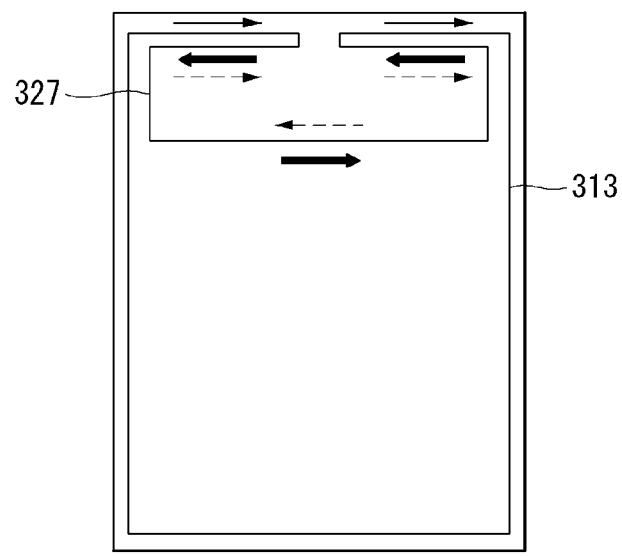
FIG. 20 shows another example of an antenna according to an embodiment of the invention.

FIG. 20 shows another example of the antenna according to the embodiment of the invention. Referring to FIG. 20, electric current may flow in a formation area of a first coil 313 and a formation area of a second coil 327 in opposite directions. For example, electric current may flow in the first coil 313 in a first direction corresponding to a clockwise direction, and electric current may flow in the second coil 327 in a second direction corresponding to a counterclockwise direction.

In a related art, when electric current flows in the first coil 313, an eddy current may be produced in the opposite direction according to Images Theory. The eddy current may be a ground current. The eddy current may flow in the opposite direction to the electric current flowing in the first coil 313. Hence, the eddy current may produce a magnetic field in the opposite direction to a magnetic field produced by the first coil 313. The magnetic field produced by the eddy current may cause a total amount of radiated magnetic field to be less than an amount of the magnetic field produced by the first coil 313.

Further, because the mobile terminal according to the embodiment of the invention further includes the second coil 327, in which the electric current flows in the opposite direction to the first coil 313, the eddy current can flow in the same direction as the first coil 313. Hence, an amount of magnetic field radiated by the first coil 313 and the second coil 327 increases.

As shown in FIG. 20, the electric current of the first coil 313 indicated by thin solid line flows in the same direction as the eddy current (i.e., the ground current) indicated by dotted line and flows in the opposite direction to the electric current of the second coil 327 indicated by a bold solid line.

Figure 21:
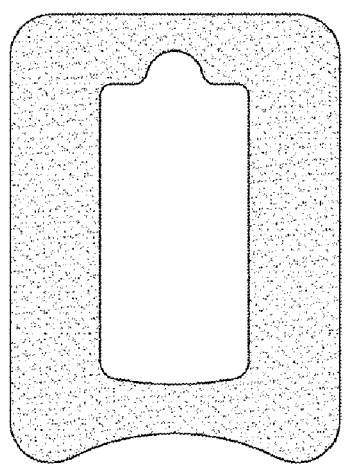
FIG. 21 shows an example of a radiation effect of an antenna according to an embodiment of the invention.
Figure 21:
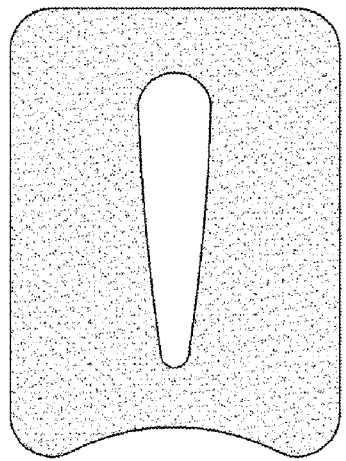

Next, FIG. 21 shows an example of a radiation effect of the antenna according to the embodiment of the invention. As shown in (a) of FIG. 21, the related art mobile terminal not including the second coil has a null point in the middle of the irradiated magnetic field. The magnetic field may not be irradiated or may be slightly irradiated at the null point.

Further, as shown in (b) of FIG. 21, the mobile terminal according to the embodiment of the invention including the second coil has a null point, of which the size greatly decreases compared to the related art. This is because the amount of magnetic field radiated from the mobile terminal further increases by causing a ground coupling current and the electric current of the first coil to flow in the same direction.

Figure 22:
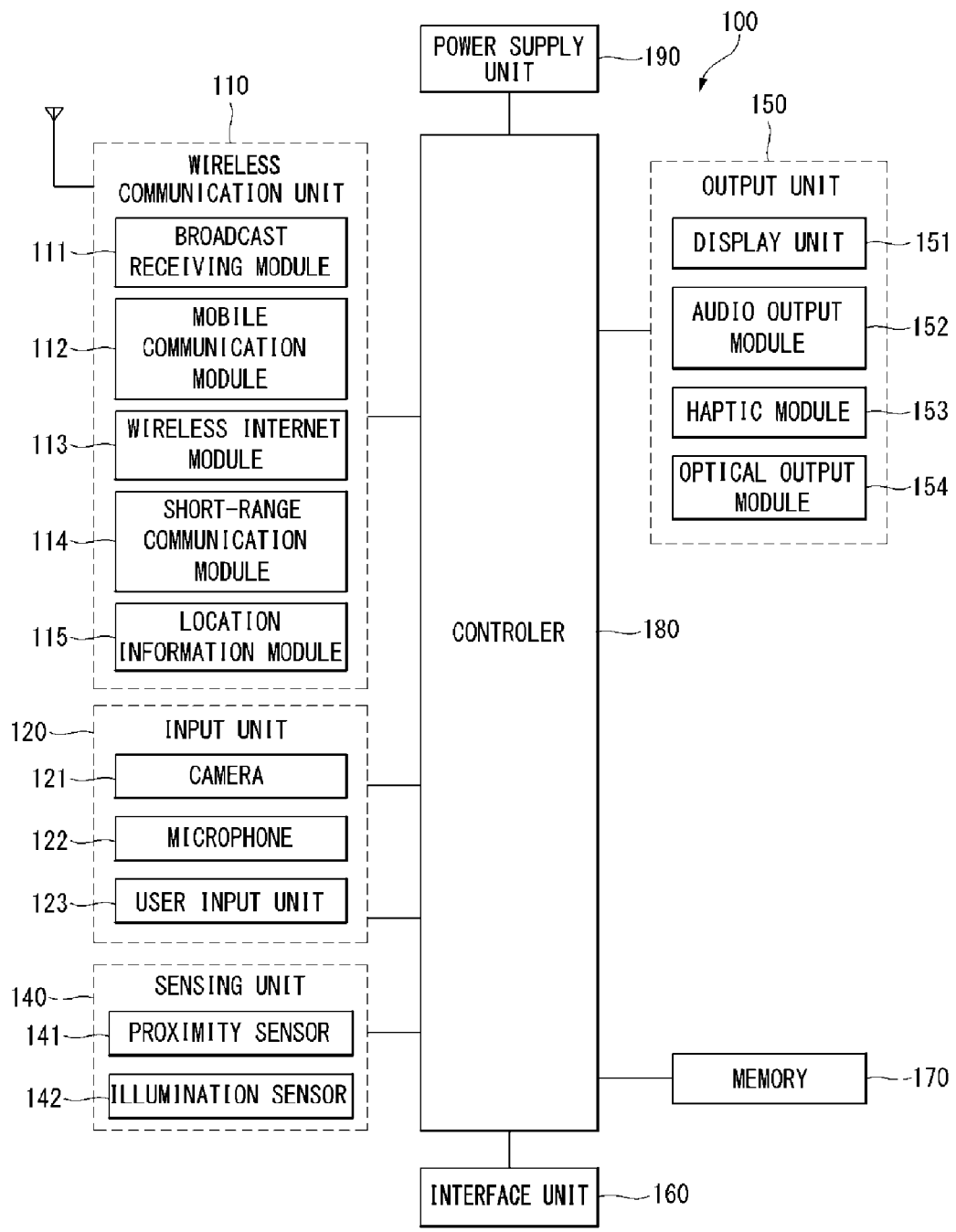
FIG. 22 is a block diagram of a mobile terminal according to an embodiment of the invention.

FIG. 22 is a block diagram of the mobile terminal according to the embodiment of the invention. More specifically, FIG. 22 shows a wireless communication unit 110, an input unit 120, the sensing unit 140, an output unit 150, the interface unit 160, the memory 170, the controller 180, and the power supply unit 190 of the mobile terminal. All of the components shown in FIG. 22 are not a requirement, and that greater or fewer components may alternatively be implemented.

Referring to FIG. 22, the mobile terminal 100 is shown having wireless communication unit 110 configured with several implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 22, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). The application programs can be stored in the memory 170, installed in the mobile terminal 100, and executed by the controller 180 to perform an operation (or function) for the mobile terminal 100.

The controller 180 controls overall operation of the mobile terminal 100, in addition to the operations associated with the application programs. The controller 180 can provide or process information or functions appropriate for a user by processing signals, data, information and the like, which are input or output by the various components depicted in FIG. 22, or activating application programs stored in the memory 170. As one example, the controller 180 controls some or all of the components illustrated in FIGS. 1A and 1B according to the execution of an application program stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a portion of the components illustrated in FIG. 22 may cooperatively operate to implement an operation, a control, or a control method of the electronic device 100 according to various embodiments of the invention that will be described below. The operation, the control, or the control method of the electronic device 100 may be implemented by the execution of at least one application program stored in the memory 170.

Figure 23:
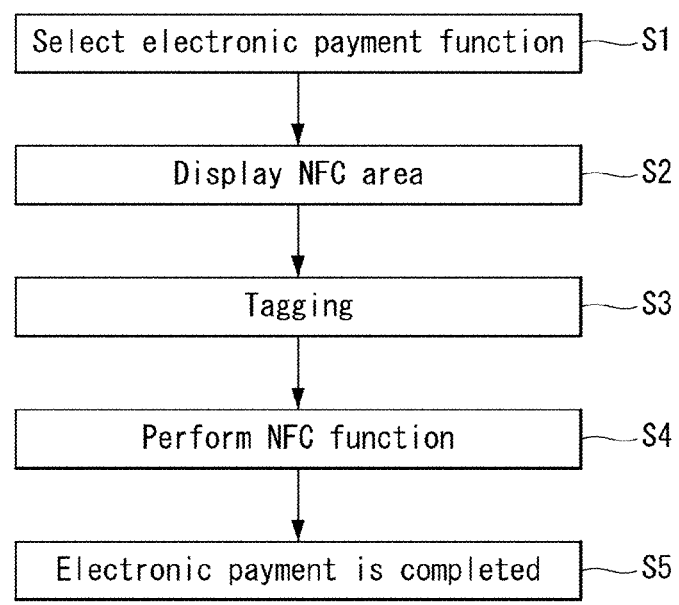
FIGS. 23 and 24 show an example of a short range communication method in a mobile terminal according to an embodiment of the invention.
Figure 24:
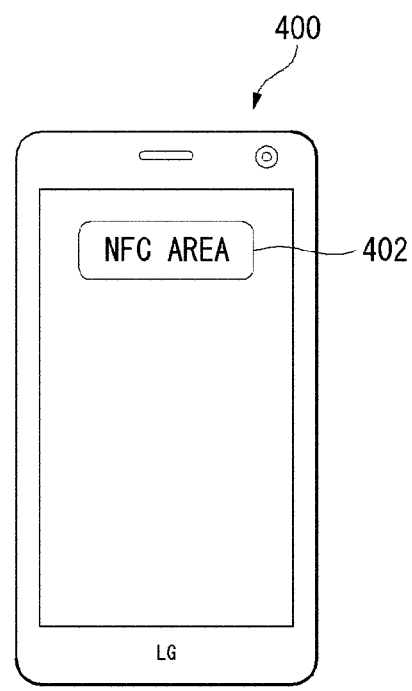

Next, FIGS. 23 and 24 show an example of a short range communication method in the mobile terminal according to an embodiment of the invention. When an electronic payment function of a mobile terminal 400 is selected (S1), a short range communication area, for example, an NFC area 402 may be displayed on a display of the mobile terminal 400 (S2). When the NFC area 402 approaches another NFC terminal (S3), an NFC function of the mobile terminal 400 may be performed (S4). Hence, electronic payment of the mobile terminal 400 can be completed (S5). Therefore, the user can more efficiently perform the electronic payment by recognizing the NFC area 402 of his/her mobile terminal 400. Namely, when the user makes an attempt at the electronic payment, the user can increase a success rate of tagging by accurately tagging the NFC area 402 of the mobile terminal 400.

Figure 25:
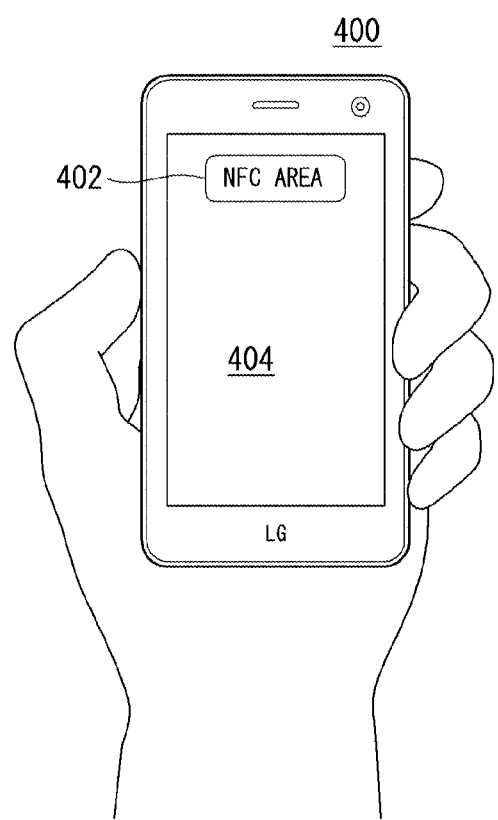
FIGS. 25 and 26 show an example where a mobile terminal according to an embodiment of the invention is used.
Figure 26:
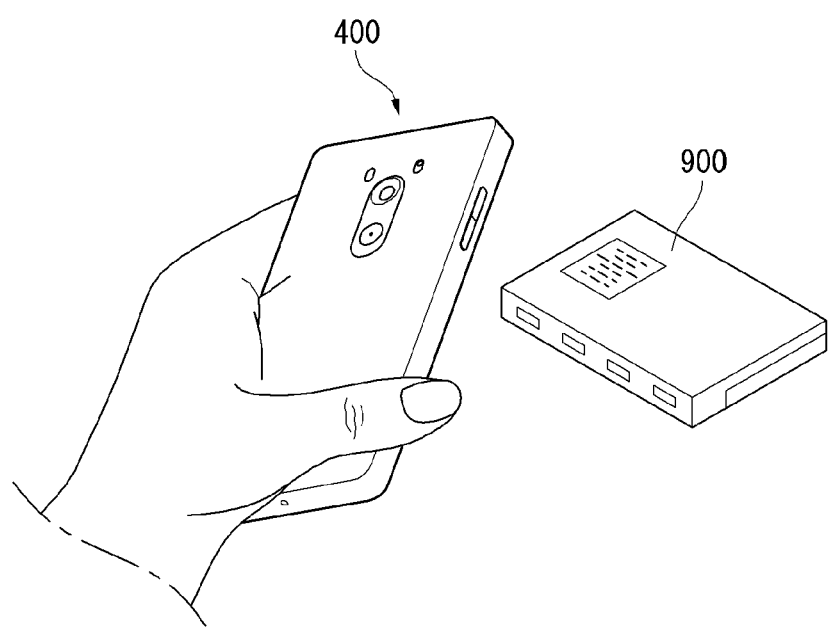

FIGS. 25 and 26 show an example where the mobile terminal according to the embodiment of the invention is used. When the user uses the mobile terminal 400, the user generally grabs the mobile terminal 400 with his/her hand as shown in FIGS. 25 and 26. For example, the user grabs the mobile terminal 400 with one hand and touches a display 404 of the mobile terminal 400 with the other hand, operating the mobile terminal 400.

In addition, the user can use the mobile terminal 400 to take a bus or a subway and to buy something at the same time while operating the mobile terminal 400. In this instance, the electronic payment function of the mobile terminal 400 is used. The user can easily use the electronic payment function of the mobile terminal 400 according to the embodiment of the invention while grabbing the mobile terminal 400 with his/her hand. The user can also easily and accurately perform the electronic payment by tagging the NFC area 402 (refer to FIGS. 23 and 24) of the mobile terminal 400 to an external terminal 900.

Figure 27:
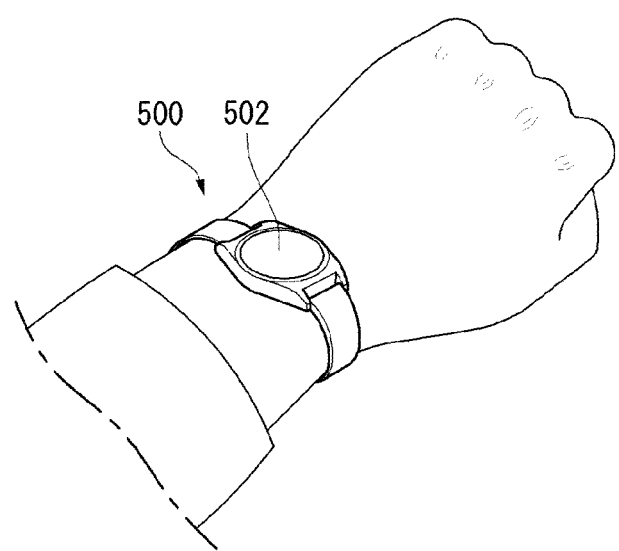
FIGS. 27 and 28 show an example where a wearable device according to an embodiment of the invention is used.
Figure 28:
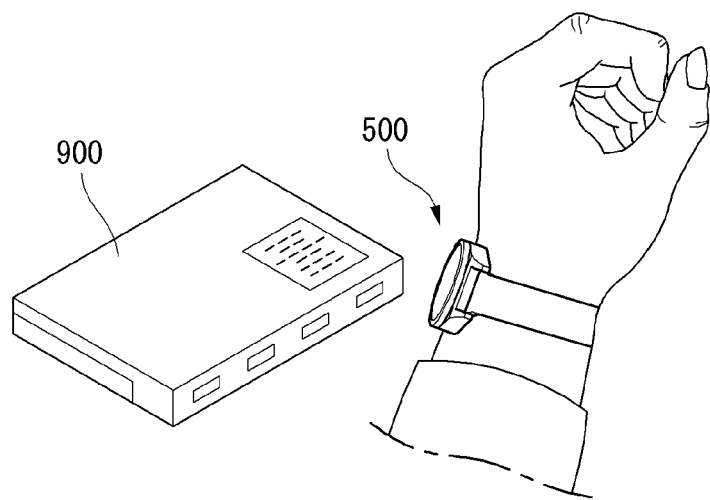

FIGS. 27 and 28 show an example where the wearable device according to the embodiment of the invention is used.

When the user uses a wearable device 500, the user may generally wear the wearable device 500 with his/her body, for example, one wrist as shown in FIGS. 27 and 28. In this instance, the user may touch a display 502 of the wearable device 500 with the other hand, with which user does not wear the wearable device 500. The user can use the wearable device 500 to take a bus or a subway and to buy at the same time while operating the wearable device 500. In this instance, the electronic payment function of the wearable device 500 is used. The user can easily use the electronic payment function of the wearable device 500 according to the embodiment of the invention while wearing the wearable device 500. FIG. 28 shows that the user tags the wearable device 500 to an external terminal 900.

Figure 29:
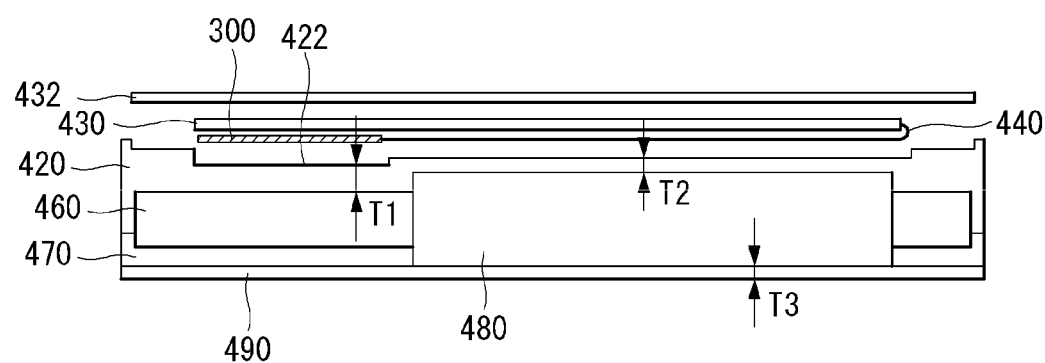
FIGS. 29 to 31 show other examples of a cross section of a mobile terminal shown in FIG. 8.

FIG. 29 shows a touch window 432, a display panel 430, an antenna 300, a FPCB 440, a frame 420, a depression 422, a PCB 460, a back cover 470, a battery 480, and a battery cover 490 of the mobile terminal. In FIG. 29, the frame 420, the back cover 470, and the battery cover 490 may be formed of synthetic resin. Structures and components identical or equivalent to those described above are designated with the same reference numerals, and a further description may be briefly made or may be entirely omitted.

The frame 420 may protrude and surround the side of the touch window 432. In other words, the frame 420 at the display panel 430 may be configured to surround the touch window 432 at the side of the touch window 432. As the frame 420 wraps or surrounds the touch window 432, the touch window 432 or the display panel 430 may be prevented or reduced from being damaged when an external impact is applied to the mobile terminal.

Figure 30:
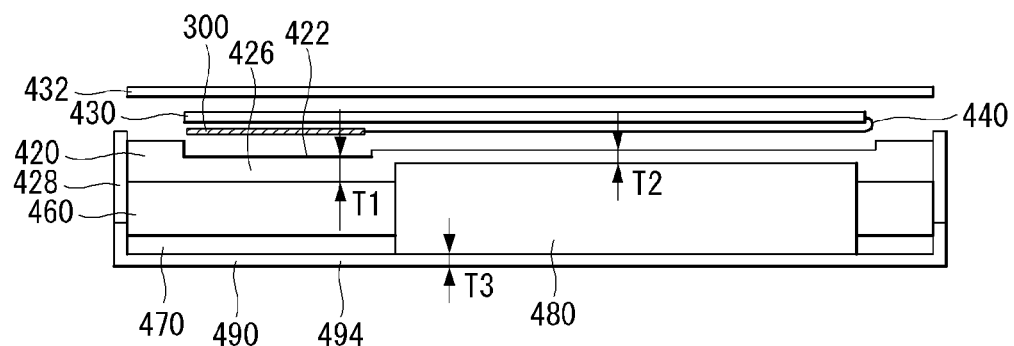

FIG. 30 shows a touch window 432, a display panel 430, an antenna 300, a FPCB 440, a frame 420, a depression 422, a PCB 460, a back cover 470, a battery 480, and a battery cover 490 of the mobile terminal. In FIG. 30, an inner part 426 of the frame 420 is formed of synthetic resin, and an outer part 428 of the frame 420 is formed of metal. The battery cover 490 is formed of metal. Structures and components identical or equivalent to those described above are designated with the same reference numerals, and a further description may be briefly made or may be entirely omitted.

The frame 420 may protrude and surround the side of the touch window 432. In other words, the frame 420 at the display panel 430 may be configured to surround the touch window 432 at the side of the touch window 432. As the frame 420 wraps or surrounds the touch window 432, the touch window 432 or the display panel 430 may be prevented or reduced from being damaged when an external impact is applied to the mobile terminal.

Figure 31:
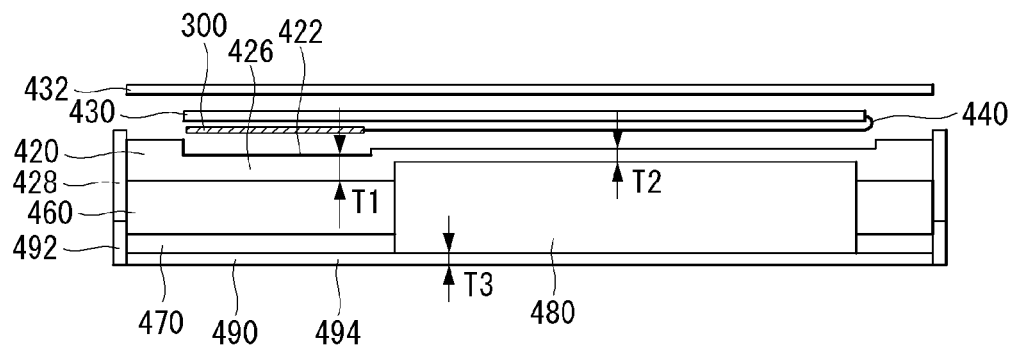

FIG. 31 shows a touch window 432, a display panel 430, an antenna 300, a FPCB 440, a frame 420, a depression 422, a PCB. 460, a back cover 470, a battery 480, and a battery cover 490 of the mobile terminal. In FIG. 31, an inner part 426 of the frame 420 is formed of synthetic resin, and an outer part 428 of the frame 420 is formed of metal. A portion 492 of the battery cover 490 is formed of metal, and another portion 494 of the battery cover 490 may be formed of synthetic resin. Structures and components identical or equivalent to those described above are designated with the same reference numerals, and a further description may be briefly made or may be entirely omitted.

The frame 420 may protrude and surround the side of the touch window 432. In other words, the frame 420 at the display panel 430 may be configured to surround the touch window 432 at the side of the touch window 432. As the frame 420 wraps or surrounds the touch window 432, the touch window 432 or the display panel 430 may be prevented or reduced from being damaged when an external impact is applied to the mobile terminal. Referring to FIGS. 29 to 31, the frame 420, the back cover 470, and the battery cover 490 may be formed integrally formed.

Accordingly, the present invention provides several advantages. For example, the mobile terminal can perform the short range communication while having the terminal exterior formed of the metal material. The mobile terminal can also be slimmer.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The embodiments and/or the configurations of the invention may be combined with each other. Namely, although the combination between the configurations is not directly described, the combination is possible. Although embodiments have been described with reference to a number of illustrative embodiments thereof, numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display panel;
   a printed circuit board;
   a frame having a first surface supporting the display panel and a second surface facing the printed circuit board;
   a back cover coupled to the frame to cover a battery and formed of a metal;
   a short range antenna disposed on the first surface of the frame and disposed between the frame and the display panel and having a radiation direction toward an opposite direction to the metal; and
   the battery disposed on a portion of the second surface opposite to the first surface,
   wherein the frame has a first depressed portion recessed from a portion of the first surface of the frame and a second depressed portion within the first depressed portion and being recessed from the first depressed portion,
   wherein the short range antenna is disposed within the second depressed portion,
   wherein the frame has a first portion overlapped with a portion of the printed circuit board and including the second depressed portion, and a second portion where the battery is disposed on,
   wherein at least part of the display panel, the short range antenna, the frame and the printed circuit board are stacked sequentially in a region where the second depressed portion of the frame is formed, and the short range antenna radiates a short-range communication signal toward the display panel,
   wherein the short range antenna is disposed on a flexible printed circuit board, and
   wherein the display panel and the flexible printed circuit board are disposed at the first depressed portion.

2. The mobile terminal of claim 1, wherein the frame includes a metal material.

3. The mobile terminal of claim 1, further comprising:
   a shielding layer disposed between the frame and the short range antenna.

4. The mobile terminal of claim 1,
   wherein the flexible printed circuit board electrically connects the display panel to a controller, and
   wherein the short range antenna is disposed on the flexible printed circuit board and is electrically insulated from the flexible printed circuit board.

5. The mobile terminal of claim 4, further comprising:
   a substrate including at least one electronic element, the substrate being on the second surface of the frame,
   wherein the controller is mounted on the substrate.

6. The mobile terminal of claim 5, wherein the flexible printed circuit board electrically connects the display panel to the controller, and
   wherein the short range antenna extends from the flexible printed circuit board.

7. The mobile terminal of claim 1, wherein the short range antenna is disposed in the second depressed portion corresponding to an upper portion of the display panel when the display panel is in a portrait view.

8. The mobile terminal of claim 1, wherein the short range antenna is disposed in the second depressed portion corresponding to a central portion of the display panel.

9. The mobile terminal of claim 1, wherein the short range antenna is disposed in the second depressed portion corresponding to an outer portion of the display panel.

10. The mobile terminal of claim 1, wherein the short range antenna includes one wire and forms a winding on different planes.

11. The mobile terminal of claim 10, wherein the short range antenna includes a first coil and a second coil, which is connected to the first coil and is formed on a plane different from the first coil.

12. The mobile terminal of claim 11, wherein the first coil and the second coil have a loop shape, and
    wherein the first and second coils of the loop shape form at least one turn.

13. The mobile terminal of claim 11, wherein the second coil is connected to the first coil and is formed at a height different from the first coil in a thickness direction of the mobile terminal.

14. The mobile terminal of claim 1, wherein the short range antenna comprises a near field communication antenna.

15. The mobile terminal of claim 1, further comprising:
    a controller configured to control the short range antenna to transmit payment information to an external payment terminal in response to the mobile terminal being with a short range from the external payment terminal.

16. The mobile terminal of claim 1, wherein the mobile terminal comprises a smart watch.

17. The mobile terminal of claim 1, wherein the short range antenna is formed on the flexible printed circuit board such that the a portion of flexible printed circuit board is also disposed in the second depressed portion and the short range antenna faces the display panel.

18. The mobile terminal of claim 17, wherein the second depressed portion is formed at a position of the frame corresponding to an upper portion of the display panel when the display panel is in a portrait view.

19. The mobile terminal of claim 18, wherein the flexible printed circuit board extends lengthwise under the display panel and connects to a lower portion of the display panel and also passes through an opening in the frame to connect to a lower portion of a printed circuit board disposed below the frame.

* * * * *